(12) United States Patent
Muti et al.

(10) Patent No.: US 7,216,180 B1
(45) Date of Patent: May 8, 2007

(54) SYSTEM AND METHOD FOR MODIFYING AN INFORMATION TRANSFER REQUEST

(75) Inventors: Alessandro Muti, Redmond, WA (US); Brian J. Moore, Redmond, WA (US); Anthony Andreas Ciccone, Bellevue, WA (US); Darshatkumar A. Shah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 09/761,399

(22) Filed: Jan. 16, 2001

(51) Int. Cl.
*G06F 15/16* (2006.01)
*G06F 15/173* (2006.01)

(52) U.S. Cl. ............ 709/246; 709/228; 709/238

(58) Field of Classification Search ........ 709/203, 709/212, 218, 223, 224, 227, 231
See application file for complete search history.

(56) References Cited

U.S. PATENT DOCUMENTS

| | | | |
|---|---|---|---|
| 6,209,048 B1 * | 3/2001 | Wolff | 710/62 |
| 6,314,456 B1 * | 11/2001 | Van Andel et al. | 709/218 |
| 6,434,607 B1 * | 8/2002 | Haverstock et al. | 709/217 |
| 6,609,159 B1 * | 8/2003 | Dukach et al. | 719/331 |
| 6,654,794 B1 * | 11/2003 | French | 709/217 |
| 6,665,721 B1 * | 12/2003 | Hind et al. | 709/227 |
| 6,718,389 B2 * | 4/2004 | Navarre et al. | 709/227 |

OTHER PUBLICATIONS

Thiemann, P.; "Modeling HTML in Haskell", *Practical Aspects of Declarative Languages. Second International Workshop, PADL, 2000*, 2000, p. 263-277.

\* cited by examiner

*Primary Examiner*—Ario Etienne
*Assistant Examiner*—Hussein El-chanti
(74) *Attorney, Agent, or Firm*—Amin, Turocy & Calvin, LLP

(57) ABSTRACT

Disclosed is a system and methodology for recognizing when an Information Transfer Request (ITR) should be modified, for creating such a modified request and for processing such a modified information transfer request to produce a desired response. Also disclosed is a client side component that can identify when an information transfer request in a particular format may not produce a desired response, a client side component that can reformat an information transfer request from one that may not produce a desired response to one that may produce a desired response and a server side component that can recognize reformatted information transfer requests and process those requests to produce the desired response.

25 Claims, 8 Drawing Sheets

SYSTEM AND METHOD FOR MODIFYING AN INFORMATION TRANSFER REQUEST

TECHNICAL FIELD

The present invention relates generally to data processing and data communications systems. More particularly, a system and method is provided for processing information transfer requests transmitted via incompatible data communications systems.

BACKGROUND OF THE INVENTION

With the growth of computer networks, it is now possible for computers to make large numbers of information transfer requests to many other computer systems. A common information transfer request ("ITR") provides for receiving all or portions of files from another computer. For example, the Hypertext Transfer Protocol ("HTTP"), an application-level protocol for distributed, collaborative, hypermedia information systems, has been in use since 1990 and includes methods for requesting and transferring information. An early version of HTTP, the 0.9 version, provided a protocol for raw data transfer across the Internet. Subsequently, HTTP versions 1.0 and 1.1 have appeared.

When a computer sends an ITR to another computer, the ITR may traverse data communication systems that may include one or more servers and one or more proxy servers. Not all of the servers or proxy servers may support the same data communications protocol, however. For example, some servers may support HTTP 1.1 while others may support HTTP 1.0. Generally, newer versions of protocols are backwards compatible with older versions of protocols and thus can successfully process ITRs formatted in the older versions. A problem arises, however, when an ITR formatted in a newer protocol arrives at a server supporting an older protocol. The effects on the ITR formatted in the newer protocol when processed by the server supporting the older protocol may be unpredictable and unwanted. For example, HTTP 1.1 supports a byte range specification in an ITR and thus a portion of a file, specified by the byte range, may be requested, however HTTP 1.0 does not support a byte range specification. Thus, when an HTTP 1.1 ITR with a byte range specification is processed by a server supporting HTTP 1.0, the HTTP 1.0 server may discard the byte range specification or may even discard the entire ITR. Thus, there exists a need for a system that can recognize when an ITR has not successfully traversed data communications systems and for reformatting the ITR in order that the ITR may successfully traverse the data communications systems and generate a desired response.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for processing information transfer requests. An information transfer request ("ITR") may be sent from a requesting client to a server. The client and the server may be programmed to process ITRs formatted in a particular protocol (e.g., version). The ITR may traverse one or more communication and/or proxy servers during the trip from the client to the server. The communication and/or proxy servers may not be programmed to process ITRs formatted in the protocol utilized by the client and the server and thus may corrupt, modify, or destroy ITRs formatted in the protocol utilized by the client and the server. The present invention enables ITRs to travel uncorrupted from client to server, via paths that may include incompatible communication and/or proxy servers.

More specifically, the present invention provides a system and method for identifying when sending an ITR formatted in a protocol utilized by the client and server has not resulted in information requested. This may be due to incompatibly programmed communication and/or proxy servers, for example. The present invention also provides, after such an identification, for reformatting the ITR into a one or more different ITR formats which appear as an earlier version of the present protocol.

The present invention may include a client component that identifies when an ITR formatted in a particular protocol did not produce the requested information because an intermediary communication and/or proxy server was not programmed to process ITRs formatted in the particular protocol. The present invention may further include a client component that reformats ITRs formatted in the particular protocol, which did not produce the information requested, into ITRs formatted in one or more different protocols. The ITRs formatted in the one or more different protocols can traverse the communication and/or proxy servers without being corrupted.

In another aspect, the present invention includes server components that recognize the ITRs reformatted in the one or more different formats and that process the modified ITRs to produce the desired response.

One aspect of the present invention provides a system for processing an information transfer request ("ITR") including: an identifying component for identifying whether an ITR formatted in a second format produced a desired response; and an altering component for altering the ITR formatted in the second format to an ITR reformatted in one or more first formats so that the desired response may be produced.

Another aspect of the present invention provides a system for processing an information transfer request ("ITR") including a recognizing component for recognizing an ITR reformatted in one or more first formats, the one or more first formats being earlier versions than an original formatting version of the ITR. The system further includes a processing component for processing the ITR reformatted in the one or more first formats to produce a desired response.

Another aspect of the present invention provides a data packet adapted to be transmitted from a first computer process to a second computer process, the data packet including information related to an information transfer request (ITR) formatted in one or more first protocols so that the ITR contains formatting information sufficient to translate the ITR into a second protocol.

Yet another aspect of the present invention provides a computer readable medium having stored thereon a data structure, the data structure including a first data field containing information related to an information transfer request (ITR) formatted in a first protocol so that the ITR contains formatting information sufficient to translate the ITR into one or more second protocols.

Still another aspect of the present invention provides a method for processing an ITR including sending a first ITR formatted in a second format and evaluating a response to the first ITR. The method also includes generating a reformatted second ITR, where the second ITR is reformatted in one or more first formats and carries information sufficient to translate the second ITR into an ITR formatted in the second format.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
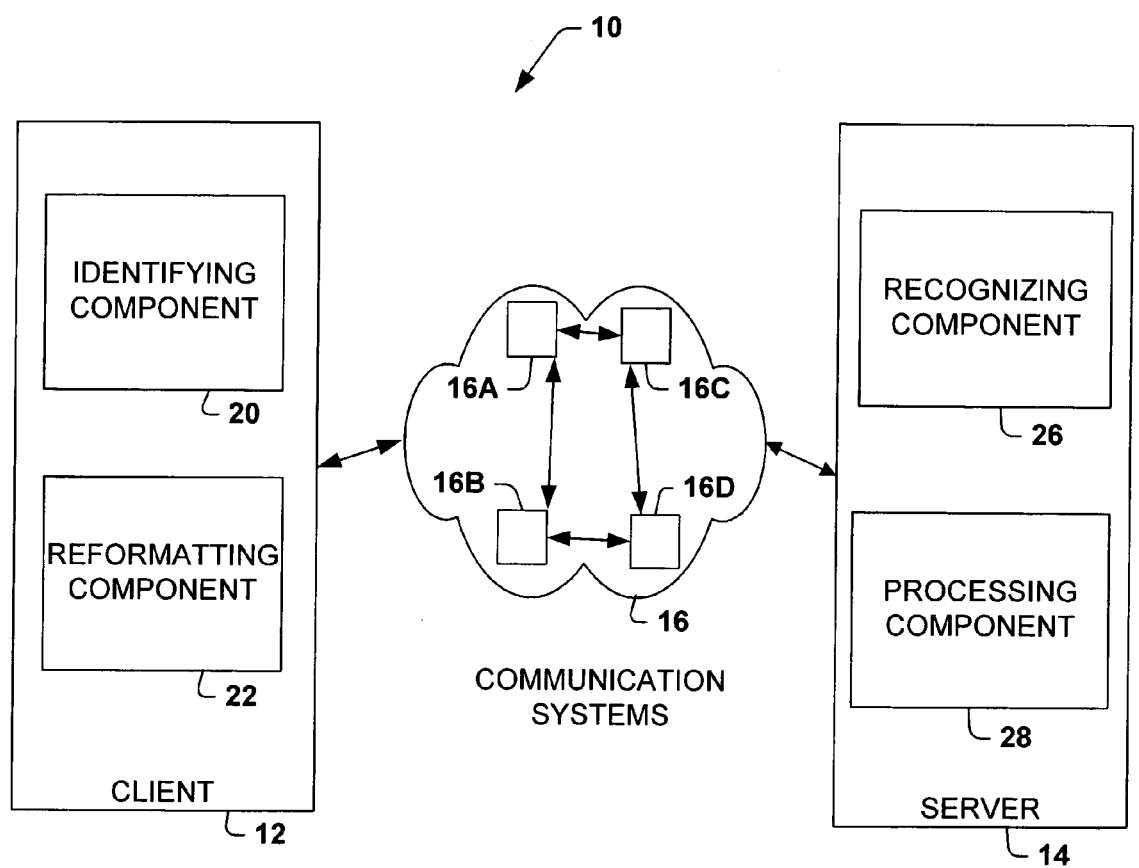
FIG. 1 is a schematic block diagram illustrating a system for processing information transfer requests ("ITR") in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

The present invention relates to a system and methodology for recognizing when an information transfer request ("ITR") should be modified, modifying the ITR, recognizing the modified ITR and processing the modified ITR to produce a desired response.

As used in this application, the term "component" is intended to refer to a computer-related entity, either hardware, a combination of hardware and software, or alternatively, software in execution. For example, a component may be, but is not limited to, a process running on a processor, a processor, an object, an executable, a thread of execution, a program, and a computer. By way of illustration, both an ISAPI filter running on a server and the server itself can be a component.

As used in this application, the term "protocol" is intended to refer to a series of procedures and conventions that govern communications between communicating computer processes. For example, HTTP 1.0 and HTTP 1.1 are two different protocols. Protocol conventions for governing communications can include message formats. For example, HTTP 1.0 does not include a field in the message format for specifying a byte range, while HTTP 1.1 does include a field in the message format for specifying a byte range.

Referring initially to FIG. 1, a system 10 for processing ITRs is illustrated. The system 10 includes a client 12 for generating ITRs and a server 14 for processing ITRs. The client 12 may generate ITRs to request information desired at the client 12 and the server 14 may process ITRs to retrieve and transmit the information desired at the client 12. For example, the client 12 may desire an update to a computer program. The update may be stored at the server 14. The ITRs may traverse one or more communications systems 16A, 16B, 16C and 16D, hereinafter collectively known as the communication systems 16, when traveling from the client 12 to the server 14.

The client 12 may include an identifying component 20 and a reformatting component 22 and may determine when a response to an ITR has not produced a desired response. For example, if 1K bytes of information were requested and 0.37K bytes of information were returned, then the identifying component 20 may identify that the desired response was not produced and invoke the reformatting component 22 to produce a modified ITR that may traverse the communication systems 16 and yield the desired response. The reformatting component 22 may modify the ITR with formatting characters intended for use by the server 14 in processing the modified ITR.

The server 14 may include a recognizing component 26 and a processing component 28. The recognizing component 26 may receive incoming ITRs and may recognize ITRs modified by the reformatting component 22. For example, the recognizing component 26 may recognize identifying indicia (e.g., headers or characters) found in ITRs modified by the reformatting component 22. When the recognizing component 26 recognizes the modified ITR, it may pass the modified ITR to the processing component 28 for conversion back to an unmodified ITR format. For example, the processing component 28 may remove formatting headers or characters attached to the ITR by the reformatting component 22 to produce an unmodified ITR. It is to be appreciated by one skilled in the art that although four components are illustrated in FIG. 1, a greater or lesser number of components may be implemented in accordance with the present invention.

Figure 2:
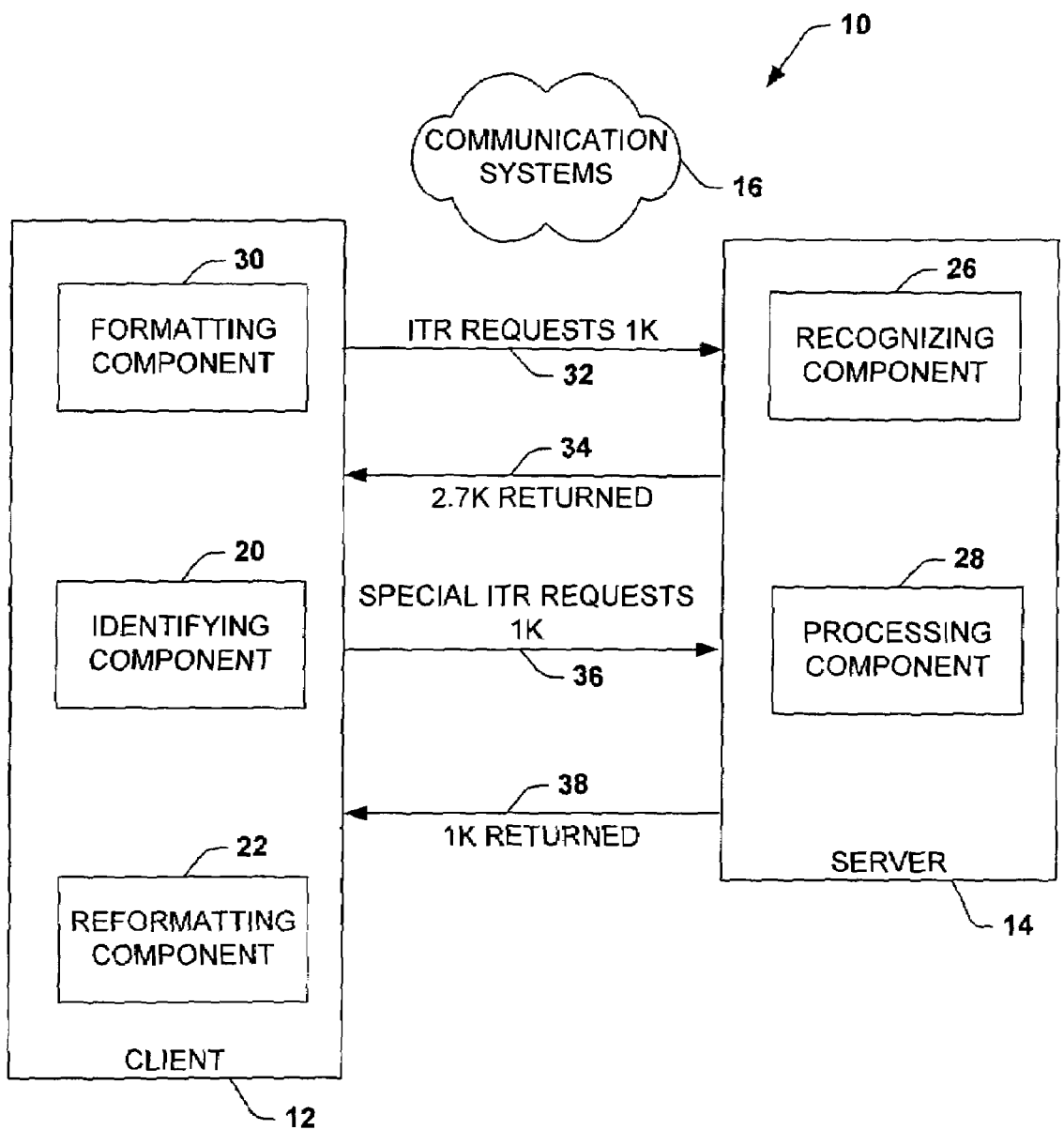
FIG. 2 is a schematic diagram illustrating the system of FIG. 1 and an exemplary message flow through the system in accordance with an aspect of the present invention.

Turning now to FIG. 2, an exemplary message flow of unmodified ITRs and modified ITRs through the system 10 for processing ITRs is illustrated. In addition to the identifying component 20 and the reformatting component 22 illustrated in FIG. 1, the client 12 may further include a formatting component 30. The formatting component 30 generates the initial ITRs formatted in a second protocol (e.g., HTTP 1.1, a more recent version). The formatting component 30 may also generate a test ITR that will travel from the client 12 to the server 14 via the communication systems 16 and be utilized in determining whether ITR reformatting may be appropriate.

By way of illustration, the formatting component 30 may produce an ITR 32 in a second protocol (e.g. HTTP 1.1) requesting 1K of a file. After traversing the data communications network 16, the ITR 32 may arrive at the server 14 absent the formatting that specifies that 1K of the file was desired. Thus, the server 14 may process the ITR 32 and generate an information transfer 34 that contains the entire contents of the file, for example 2.7K. The information transfer 34 may then arrive at the client 12 and be identified by the identifying component 20 as corresponding to the ITR 32 requesting 1K. Recognizing that the desired response was not received, the identifying component 20 may cause the reformatting component 22 to modify the ITR 32 into an ITR 36 employing a different protocol (e.g. HTTP 1.0), but which also requests 1K of the desired file.

After traversing the data communications network 16, the ITR 36 arrives at the server 14. The recognizing component 26 determines that the ITR 36 has been modified by the reformatting component 22 and passes it to the processing component 28 where it is converted back to a format substantially similar to the original ITR 32 as generated by the formatting component 30 (e.g. in HTTP 1.1). The server 14 then generates an information transfer 38 that contains the desired 1K rather than the entire contents of the file as returned in the information transfer 34. Utilizing this aspect of the present invention decreases data flow over the communications system 16 and reduces the amount of data processed at the client 12. Enabling more precise communications between the client 12 and the server 14 increases the overall efficiency of the client 12/server 14 relationship. Once it has been determined for an information transfer session that ITRs require reformatting, subsequent ITRs transmitted in the same information transfer session may be automatically reformatted. It is to be appreciated by one skilled in the art that although five components are illustrated in FIG. 2, a greater or lesser number of components may be implemented in accordance with the present invention.

Figure 3:
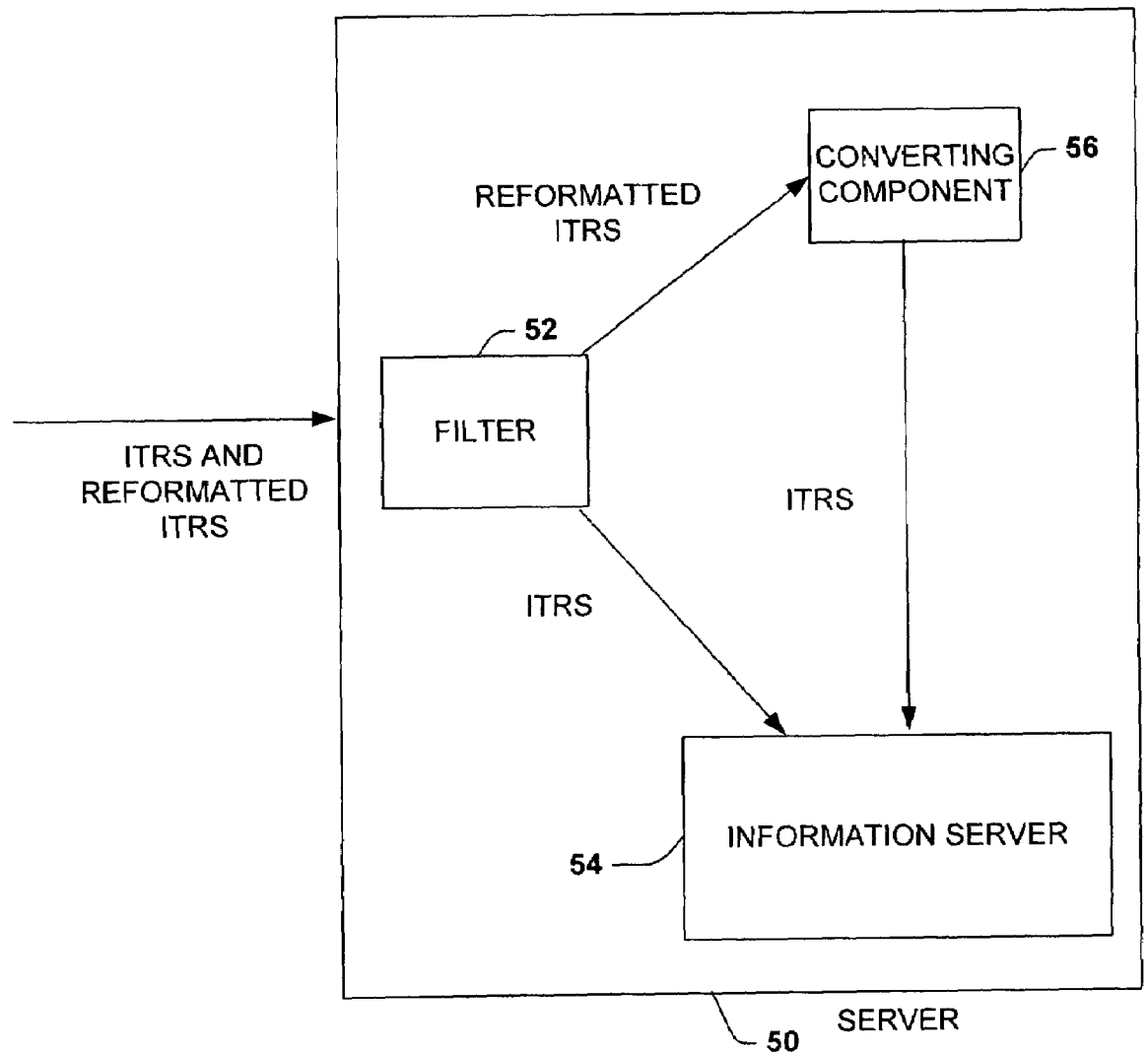
FIG. 3 is a schematic block diagram illustrating an exemplary message flow through a server component in accordance with an aspect of the present invention.

Turning now to FIG. 3 an example message flow through a server 50 selectively converting modified ITRs is illustrated. The server 50 may include a filter 52 for receiving incoming ITRs. One example of such a filter is an Internet Server Application Program Interface ("ISAPI") Dynamic Link Library ("DLL") application which may operate as an ISAPI filter. The server 50 may also include an information server 54 for retrieving the information requested in an ITR. One example of such an information server is an Internet Information Server ("IIS"). The filter 52 receives and processes incoming ITRs while the information server 54 performs the physical retrieval of the information requested in the ITR.

The filter 52 may be programmed to receive ITRs at the server 50. The ITRs received by the filter 52 may include both ITRs formatted by the formatting component 30 (FIG. 2) and ITRs modified by the reformatting component 22 (FIG. 2). When unmodified ITRs are received by the filter 52, no special processing is required and the unmodified ITR may be passed intact to the information server 54. When ITRs modified by the reformatting component 22 (FIG. 2) are received by the filter 52, a converting component 56 associated with the filter 52 may convert the modified ITRs into unmodified ITRs similar to those that may be generated by the formatting component 30 before passing the ITRs to the information server 54. Thus, the information server 54 is isolated from the formatting and reformatting process since it receives ITRs similar to those generated by the formatting component 30. The server 50 is thus enhanced by being able to process ITRs like those produced by the formatting component 30 and by the reformatting component 22. The server may thus withstand the inclusion of incompatibly programmed communication systems 16 in the path through which ITRs may travel from client 12 to server 14. Furthermore, by accepting ITRs modified by the reformatting component 22, the server 50 may produce information requested in an ITR formatted in a second protocol (e.g., HTTP 1.1., a more recent version) even if the ITR traverses communication servers incapable of processing the ITR in the second protocol.

Figure 4A:
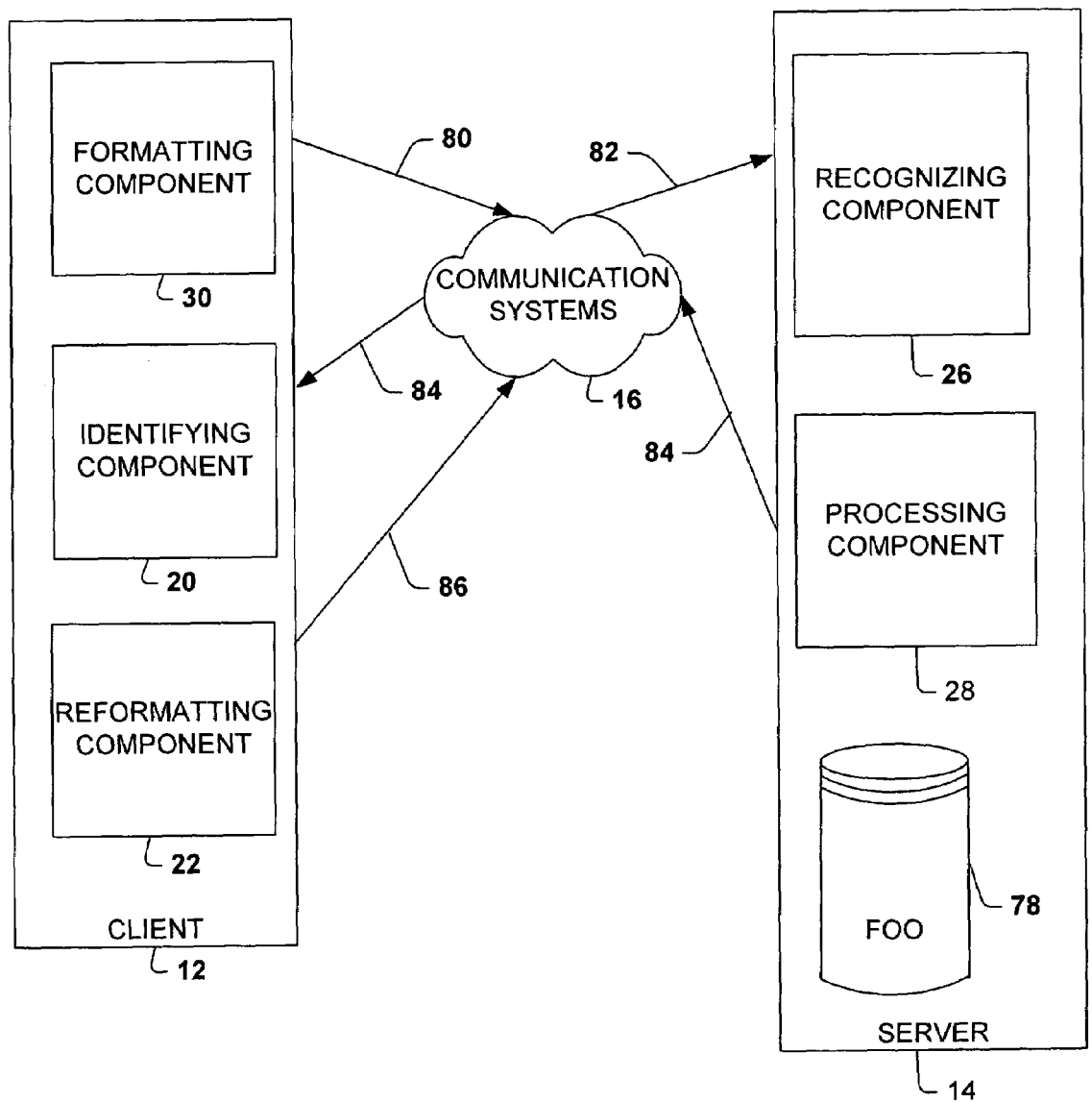
FIG. 4A is a schematic block diagram illustrating an exemplary message flow illustrating the filtering and conversion of a modified ITR in accordance with an aspect of the present invention.

Turning now to FIG. 4A, an exemplary message flow through an exemplary embodiment of the present invention illustrating the filtering and conversion of a modified ITR is provided. The client 12 may desire to retrieve the first 1K bytes from a file FOO 78 that resides on the server 14. This may be achieved by generating an ITR 80 requesting the first 1K of the file FOO 78. By way of illustration the ITR 80 may be formatted as an HTTP 1.1 GET request in the following format:

HTTP/1.1/GET/FOO range byte 0–1024

If the ITR 80 encounters a device and/or process in the path from the client 12 to the server 14 that does not support HTTP 1.1, then the ITR 80 may be altered by such a device and/or process. For example, an ITR 82 formatted in HTTP 1.0 protocol like that shown below may be produced.

HTTP/1.0/GET/FOO

If the ITR 80 was altered, as shown above, and the range specification was removed, then, for example, the entire FOO file 78 may be returned in an information transfer 84 in response to the ITR 82. The identifying component 20 may then determine that the first 1K bytes of FOO 78 were requested in the ITR 80. Thus, the identifying component 20 determines that the ITR 80 formatted as an HTTP 1.1 GET request with an associated byte range specification did not produce the desired result by, for example, comparing the amount of data requested to the amount of data returned. The identifying component 20 may then invoke the reformatting component 22 which may modify the ITR 82 and generate a new ITR 86.

Figure 4B:
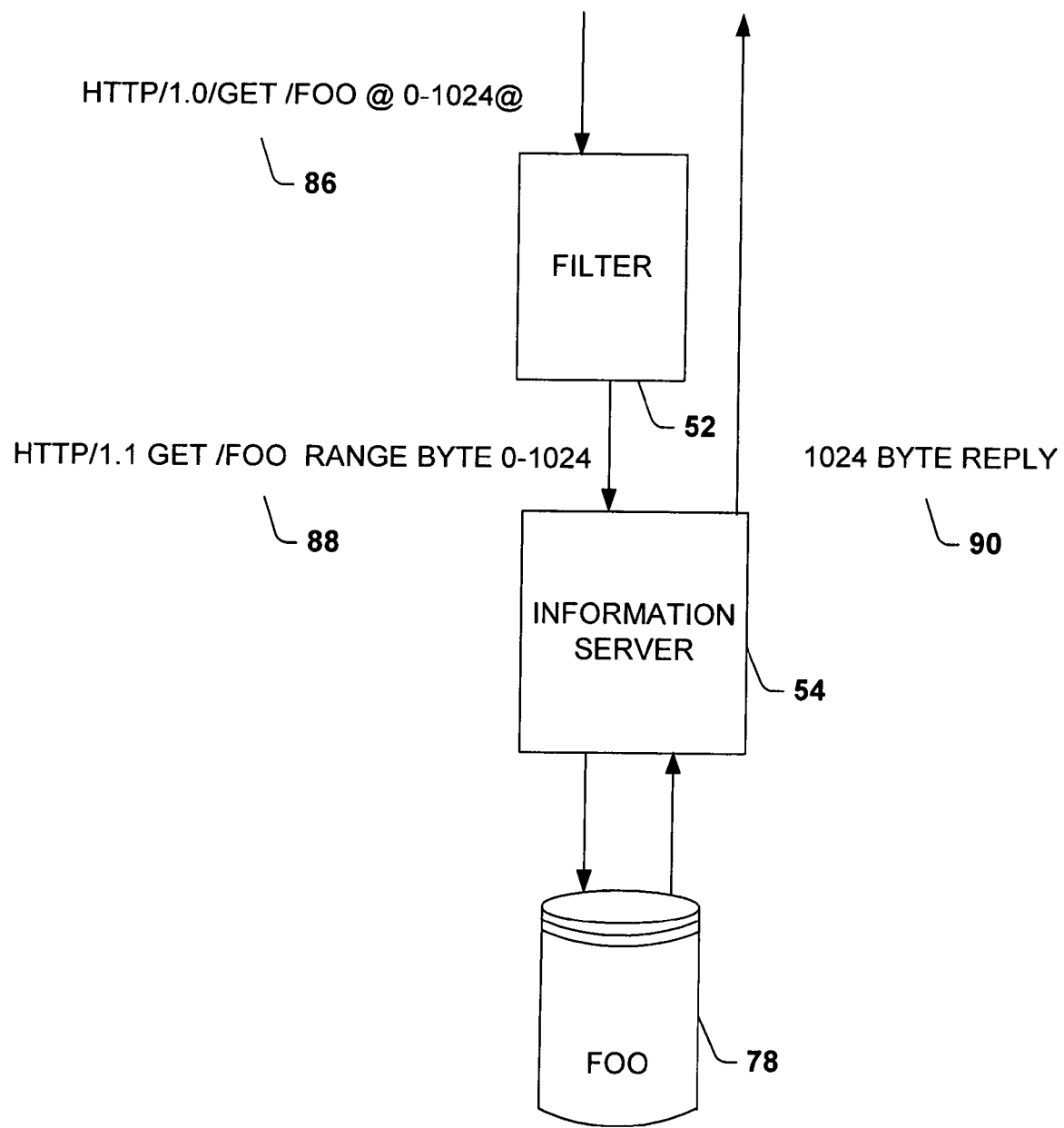
FIG. 4B is a schematic block diagram illustrating another exemplary message flow illustrating the filtering and conversion of a modified ITR in accordance with an aspect of the present invention.

Turning now to FIG. 4B, an alternative of the message flow aspect of the present invention is shown which illustrates the filtering and conversion of a modified ITR. The modified ITR 86 may be, for example, an HTTP 1.0 GET request with additional formatting characters:

HTTP/1.0/GET/FOO@0–1024@

In the ITR 86 a desired byte range request is delimited by @ characters and is embedded in the filename so that the string FOO@0–1024@ appears as a file name to HTTP 1.0 server. But the filter 52 determines that the @0–1024@ portion of the filename is an @ delimited byte range request in a modified ITR. The filter 52 may be programmed, for example, to parse incoming ITRs for filenames that contain formatting characters like @ characters. When the filter 52 determines that formatting characters are present in a filename in an incoming ITR, the filter 52 may thus produce an ITR 88 which reproduces the original ITR 80 in substantially the same original HTTP 1.1 format, for example:

HTTP/1.1/GET/FOO range byte 0–1024

The ITR 88, which in this example is an HTTP 1.1 request, is then passed to the information server 54. The information server 54 may retrieve the information requested in the ITR and then generate an information transfer 90 that includes the desired portion of the file FOO 78.

Figure 5:
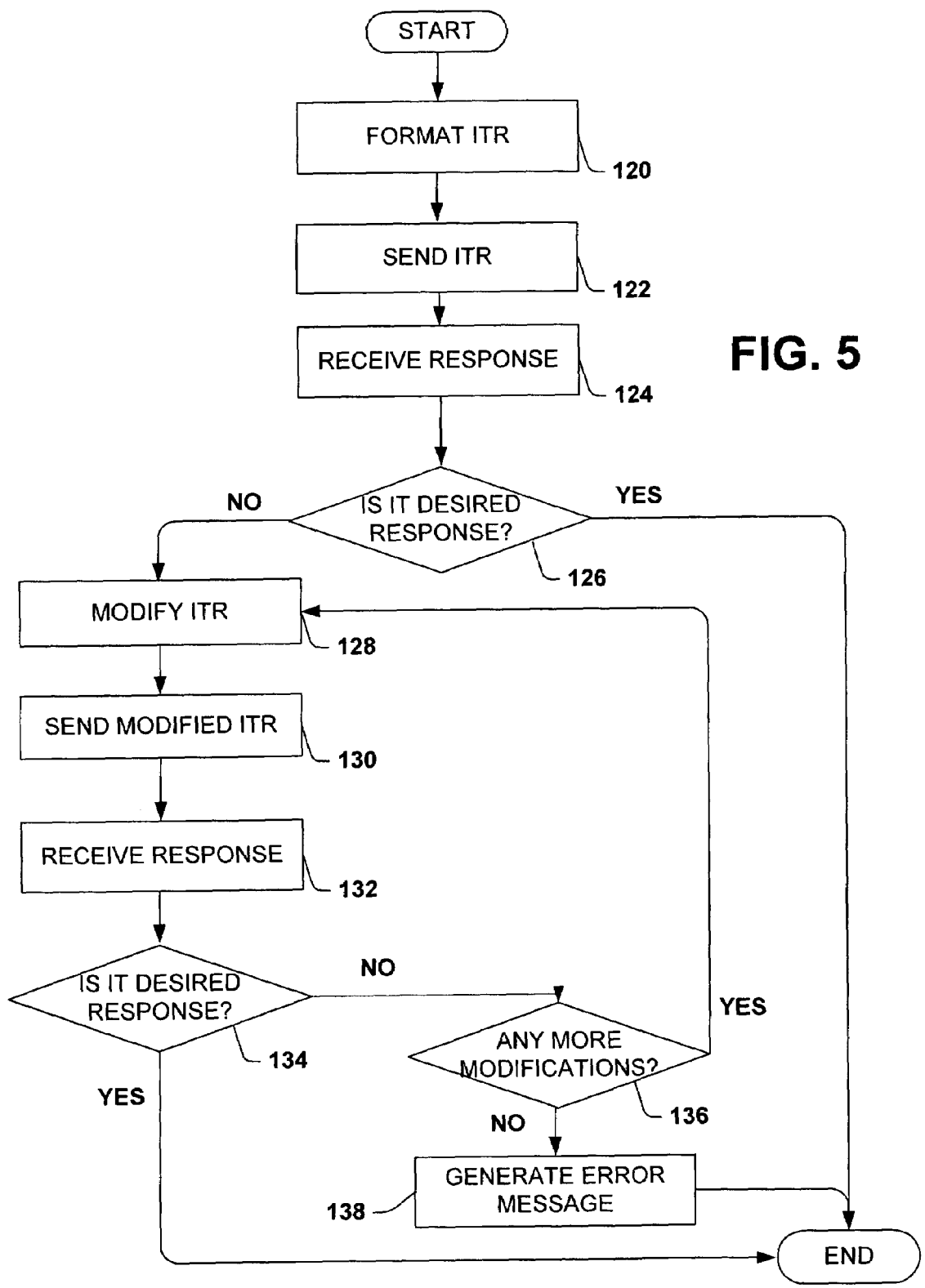
FIG. 5 is a flow diagram illustrating a methodology for client side processing in accordance with an aspect of the present invention.

Turning now to FIG. 5, a methodology for client processing in accordance with an aspect of the present invention is illustrated. The client side processing may include generating an initial ITR, examining the result produced in response to the initial ITR and sending a modified ITR. At step 120, the initial ITR is formatted. The initial ITR may, for example, be an HTTP 1.1 GET request with a byte range specification as described above. At step 122 the initial ITR is sent to a server via a data communications network. One such data communication network may be the Internet, for example. At step 124 the response to the initial ITR sent at step 122 is received. The response received may be the desired response or it may be an information transfer not conforming to the information requested. Thus, at step 126, the response is examined to determine whether it is the desired response. For example, if the ITR sent at step 122 requested 1K bytes of a file, and 37K bytes were returned, then the decision at step 126 is NO, since the desired response was not received. If the desired response was received, no further processing is necessary. If the desired response was not received, then at step 128 the initial ITR may be reformatted. For example, formatting information associated with a second protocol (e.g., more recent version—HTTP 1.1) may be removed and formatting information associated with a first protocol (e.g., older version—HTTP 1.0) may be added. Further, formatting information associated with the second protocol may be embedded in the modified ITR utilizing formatting information related to the first protocol. For example, the HTTP 1.1 GET request with a byte range specification:

HTTP/1.1/GET foo range byte 0–1024 may be reformatted as an HTTP 1.0 GET request with an @ delimited file name embedding the byte range request. For example:

HTTP/1.0/GET foo@0–1024@

At step 130 the modified ITR is sent and at step 132 the response to the modified ITR sent at step 130 is received. By reformatting the unmodified ITR that did not produce the desired result into a modified ITR, the requested information may be provided. At step 134 a determination may be made concerning whether the response of step 132 to the modified ITR of step 130 was the desired response. If the response was the desired response, processing is completed. If the response was not the desired response, then at step 136 a determination is made concerning whether any more modifications and/or protocols are available. If no more modifications and/or protocols are available, then at step 138 an error message may be generated. If more modifications and/or protocols are available, then processing continues at step 128.

Figure 6:
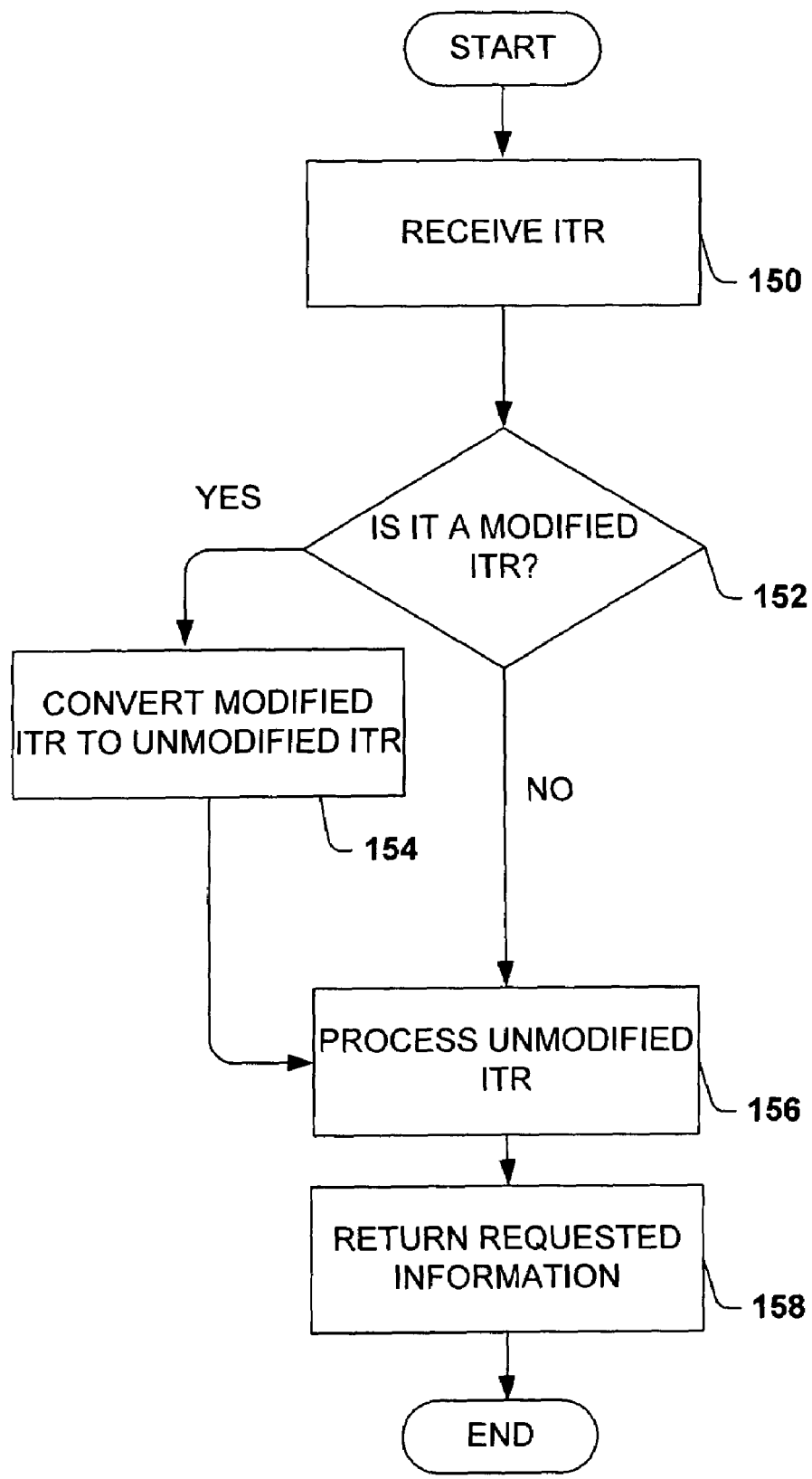
FIG. 6 is a flow diagram illustrating a methodology for server side processing in accordance with an aspect of the present invention.

Turning now to FIG. 6 a methodology for server processing in accordance with an aspect of the present invention is illustrated. The server processing may include receiving an ITR, examining the ITR to determine whether it requires conversion from a modified format to an unmodified format, and returning the information requested in the ITR. Thus, at step 150, the server may receive an ITR. At step 152 the ITR received at step 150 is examined to determine whether it is a modified ITR. For example, the ITR may be examined to determine whether headers or formatting characters corresponding to headers or formatting characters inserted into the second ITR at step 128 (FIG. 5) are present. If the ITR is a modified format, then at step 154 it may be converted from the modified format back to an unmodified format. For example, the headers or formatting characters inserted at step 128 may be removed and selectively converted back into formatting information associated with the second protocol. For example, if an @ delimited filename with an embedded byte range request is encountered, then the @ delimiters may be stripped from the request and the byte range request may be regenerated by separating the range request from the @ delimited filename. At step 156, the unmodified ITR may be processed and at step 158 the information requested may be returned. Using this methodology, both modified and unmodified ITRs can be processed by the server.

Figure 7:
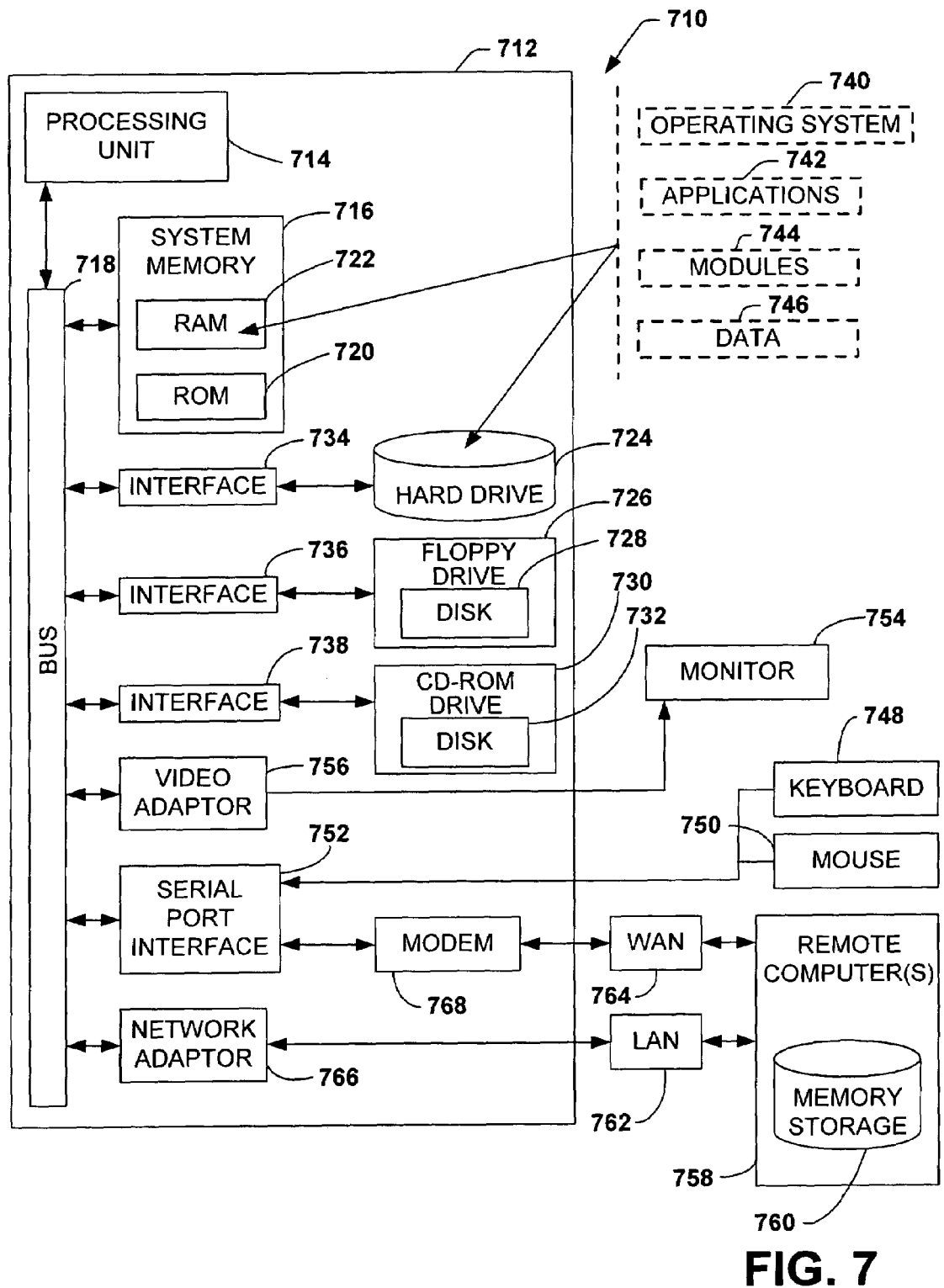
FIG. 7 is a block diagram of an exemplary operating environment for a system configured in accordance with the present invention.

In order to provide additional context for various aspects of the present invention, FIG. 7 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 7, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors, including but not limited to Intel x86, Pentium® and compatible microprocessors from Intel and others, including Cyrix, AMD and Nexgen; ALPHA® from Digital; MIPS® from MIPS Technology, NEC, IDT, Siemens, and others; and the POWERPC® from IBM and Motorola. Dual microprocessors and other multi-processor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft® Windows® NT" operating system, although it is to be appreciated that the present invention may be implemented with other operating systems or combinations of operating systems, such as UNIX, LINUX, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WEBTV® client system), a peer device or other common network node, and typically includes many or all of the elements described relative to the computer 712, although, for purposes of brevity, only a memory storage device 760 is illustrated in FIG. 7. The logical connections depicted in FIG. 7 include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, will be stored in the remote memory storage device 760. It may be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 712 or remote computer(s) 758, unless otherwise indicated. Such acts and operations are sometimes referred to as being computer-executed. It may be appreciated that the acts and symbolically represented operations include the manipulation by the processing unit 714 of electrical signals representing data bits which causes a resulting transformation or reduction of the electrical signal representation, and the maintenance of data bits at memory locations in the memory system (including the system memory 716, hard drive 724, floppy disk 728, CD-ROM 732) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as interpreted as a transitional word in a claim.

What is claimed is:

1. A system for processing an information transfer request ("ITR") comprising:
   an identifying component for identifying whether an ITR formatted in a second format produced a desired response; and
   an altering component for altering the ITR formatted in the second format to an ITR reformatted in one or more first formats so that the desired response may be produced.

2. The system of claim 1, the second format being defined in the HTTP 1.1 protocol.

3. The system of claim 1, one of the one or more first formats being defined in the HTTP 1.0 protocol.

4. The system of claim 1 wherein the ITR is an HTTP 1.1 GET request that includes a byte range specification.

5. The system of claim 1, wherein the identifying component is a computer process.

6. The system of claim 1, wherein the altering component is a computer process.

7. A system for processing an information transfer request (ITR), comprising:
   a recognizing component for recognizing an ITR reformatted in one or more first formats, the one or more first formats being earlier versions than an original formatting version of the ITR; and a processing component for processing the ITR reformatted in the one or more first formats to produce a desired response.

8. The system of claim 7, one of the one or more first formats being defined in the HTTP 1.0 protocol.

9. The system of claim 7, wherein the recognizing component is a computer process.

10. The system of claim 7, wherein the processing component is a computer process.

11. The system of claim 7, wherein the recognizing component is an ISAPI filter.

12. The system of claim 7, wherein the processing component is an ISAPI filter.

13. A method for processing an ITR comprising:
sending a first ITR formatted in a second format;
evaluating a response to the first ITR; and
generating a reformatted second ITR, where the second ITR is reformatted in one or more first formats and carries information sufficient to translate the second ITR into an ITR formatted in the second format.

14. The method of claim 13 further comprising:
sending a test ITR formatted in the second format; and
evaluating a response to the test ITR.

15. The method of claim 13 wherein evaluating the response to the first ITR further comprises:
determining whether a desired result was generated; and
initiating reformatting of the first ITR into the reformatted second ITR, where the reformatted ITR carries information sufficient to translate the second ITR into the second format.

16. The method of claim 13 wherein generating the reformatted second ITR further includes:
selectively removing formatting information associated with the second format;
selectively adding formatting information associated with the one or more first formats; and
selectively embedding formatting information associated with the second format in the reformatted second ITR using formatting information associated with the one or more first formats, where the embedded formatting information enables translating the second ITR into an ITR formatted in the first format.

17. The method of claim 13, wherein the second format is defined in the HTTP 1.1 protocol.

18. The method of claim 13, wherein one of the one or more first formats are defined in the HTTP 1.0 protocol.

19. The method of claim 13, further comprising:
recognizing an ITR reformatted in one or more first formats; and
processing the reformatted ITR to produce a desired result.

20. The method of claim 13, further comprising:
sending a test ITR formatted in the second format; and
evaluating a response to the test ITR.

21. A computer readable medium having computer-executable instructions for performing the method of claim 13.

22. A method for processing an ITR comprising:
recognizing an ITR reformatted in one or more first formats, the one or more first formats being earlier formatting versions than an original formatting version of the ITR; and
processing the reformatted ITR to produce a desired result.

23. The method of claim 22 wherein processing the reformatted second ITR comprises:
selectively removing formatting information associated with the one or more first formats from the ITR; and
selectively adding formatting information associated with the second format to the ITR so that the processed reformatted second ITR produces the desired result, the desired result being substantially the same as a result produced in response to an ITR formatted originally in the second format.

24. The method of claim 22, wherein one of the one or more first formats are defined in the HTTP 1.0 protocol.

25. A computer readable medium having computer-executable instructions for performing the method of claim 22.

* * * * *